United States Patent
Soetemans et al.

(10) Patent No.: US 7,099,979 B2
(45) Date of Patent: Aug. 29, 2006

(54) SINGLE SHELF NETWORK SYSTEM CAPABLE OF PROVIDING EXPANSION TO A MULTIPLE SHELF MODE

(75) Inventors: Joseph Soetemans, Nepean (CA); Larry Friesen, Nepean (CA)

(73) Assignee: Alcatel Canada Inc., Kanata (CA)

( * ) Notice: Subject to any disclaimer, the term of this patent is extended or adjusted under 35 U.S.C. 154(b) by 328 days.

(21) Appl. No.: 10/153,119

(22) Filed: May 22, 2002

(65) Prior Publication Data

US 2003/0061430 A1 Mar. 27, 2003

Related U.S. Application Data

(60) Provisional application No. 60/325,260, filed on Sep. 27, 2001.

(51) Int. Cl.
*G06F 13/00* (2006.01)
*H04L 12/28* (2006.01)

(52) U.S. Cl. .................. 710/300; 370/401; 370/421
(58) Field of Classification Search .............. 710/300, 710/301, 302; 370/218, 360
See application file for complete search history.

(56) References Cited

U.S. PATENT DOCUMENTS

| | | | | |
|---|---|---|---|---|
| 5,497,363 A | * | 3/1996 | Gingell | 370/376 |
| 6,768,745 B1 | * | 7/2004 | Gorshe et al. | 370/421 |
| 2002/0044525 A1 | * | 4/2002 | Czerwiec et al. | 370/216 |

* cited by examiner

*Primary Examiner*—Glenn A. Auve

(57) ABSTRACT

A single shelf network system capable of providing expansion to a multiple shelf mode is described. In one embodiment, slots are provided in a single shelf network system that are capable of accepting either I/O cards or expansion cards. When such a single shelf network system is to be operated in a single shelf mode, such slots may be provided with I/O cards to maximize the data transport capability of the single shelf network system. However, to expand the single shelf network system to function as a multiple shelf network system, the slots are provided with expansion cards. The expansion cards serve to couple a control card of the single shelf network system to one or more expansion shelves, thereby allowing the control card to exert control over the one or more expansion shelves. Since a single expansion card can support multiple expansion shelves, the number of slots of the single shelf network system needed to support expansion does not increase as additional expansion shelves are added.

25 Claims, 2 Drawing Sheets

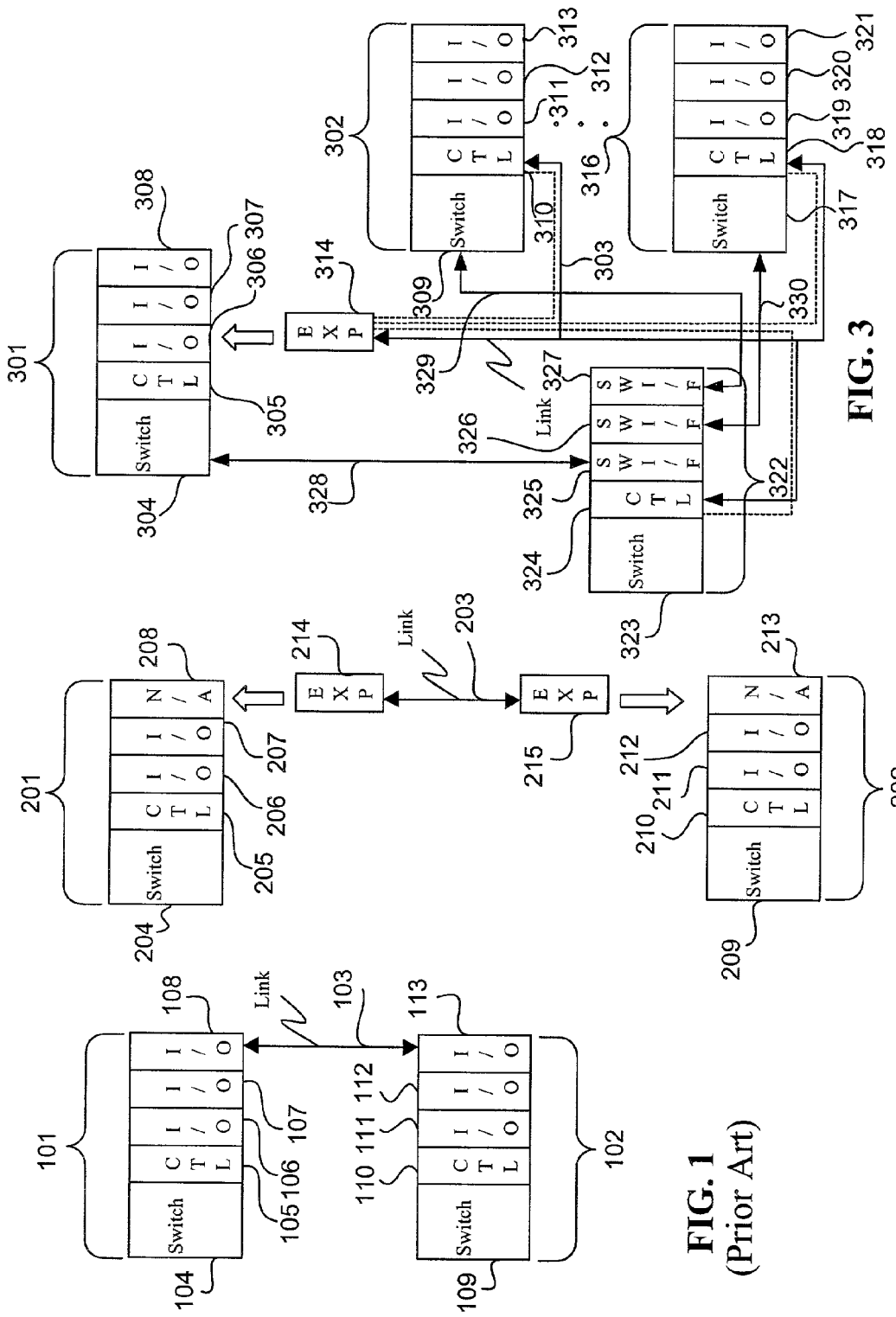

SINGLE SHELF NETWORK SYSTEM CAPABLE OF PROVIDING EXPANSION TO A MULTIPLE SHELF MODE

RELATED APPLICATIONS

This application claims the benefit of U.S. Provisional Application No. 60/325,260, filed Sep. 27, 2001.

FIELD OF THE DISCLOSURE

The present invention relates to communication networks and, more particularly, to a technique for expanding a network system.

BACKGROUND

Network systems provide a capability to transport data from various sources to various destinations. However, user demands for data transport capability tend to increase over time. Thus, it is necessary to provide an ability to expand the capability of network systems. Network systems are typically provided in housings of standardized dimensions, such as those that allow mounting in an equipment rack. Thus, efforts are typically made to provide as much data transport capability as possible using existing technology within the confines of the standardized dimensions. As an example, one housing of rack-mountable equipment may be referred to as a shelf. Within that shelf, a plurality of subsystems of a network system may be mounted. As the demand for data transport capability exceeds that provided by one shelf, it may be desirable to expand the network system from a single shelf network system to a multiple shelf network system. Different approaches to providing for such expansion have been tried with varying results.

FIG. 1 is a block diagram of an existing technique for expanding a single shelf network system by interconnecting two single shelf network systems using input/output cards. A first single shelf network system 101 includes switching fabric 104, control card 105, and input/output (I/O) cards 106–108. A second single shelf network system 102 includes switching fabric 109, control card 110, and I/O cards 111–113. I/O card 108 is coupled to I/O card 113 via link 103.

The technique of FIG. 1 suffers from several disadvantages. For example, the bandwidth of link 103 is necessarily limited by the bandwidth of I/O cards 108 and 113. Thus, unless at least half of the switching capacity in each shelf is dedicated to interconnection of the two single shelf network systems, non-blocking communication between the two single shelf network systems cannot be provided. Non-blocking communication is desirable in that it provides the ability of the full bandwidth of network traffic originating at each of several nodes of a network to be passed to among the several nodes in any combination without constraint, loss, or delay of the network traffic. The analogous example of non-blocking communication in traditional telephony is that an arbitrary half of all subscribers can call each call a unique subscriber among the remaining half of all subscribers in any combination without anyone receiving a busy signal. By not practically supporting non-blocking communications, the technique of FIG. 1 increases the likelihood of network congestion and loss or delay of data.

Another disadvantage of the technique of FIG. 1 is that both data and control information are carried over link 103. Thus, it is not possible to guarantee that control information will not adversely affect the transmission of the data. For example, control information might inadvertently be propagated to other network nodes, and those network nodes might incorrectly interpret the control information or be unable to interpret the control information, resulting in degradation of network performance or network failure. Also, in the event of a failure in either of the single shelf network systems, any attempt to isolate data between the two single shelf network systems will also cut off any communication of control information between the two single shelf network systems, thereby complicating or preventing effective diagnosis of the failure. Additionally, as more control information is passed between the two single shelf network systems, the amount of available bandwidth for communication of data is correspondingly reduced. Thus, shortages of data bandwidth may be experienced.

FIG. 2 is a block diagram of an existing technique for expanding a single shelf network system by interconnecting two single shelf network systems by installing expansion cards in dedicated expansion card slots. Single shelf network system 201 includes switching fabric 204, control card 205, I/O cards 206 and 207, and dedicated expansion card slot 208, which is not available for use with an I/O card. Single shelf network system 202 includes switching fabric 209, control card 210, I/O cards 211 and 212, and dedicated expansion card slot 213, which is not available for use with an I/O card. As can be seen, within the physical constraints of a given housing, the provision of space for dedicated expansion card slots necessarily reduces the space available for I/O cards, and, therefore, the number of I/O cards that can be supported. Consequently, the overall data bandwidth capability is correspondingly reduced. Additionally, the technique illustrated in FIG. 2 also suffers from disadvantages mentioned above in reference to FIG. 1. For example, the prevention of interference to data communication by control information cannot be guaranteed. Also, diagnosis of failures is complicated, as described above.

As can be seen, existing techniques for expansion of single shelf network systems exhibit numerous deficiencies. Thus, a technique is needed that provides for expansion of single shelf network systems without the disadvantages that result from existing techniques.

BRIEF DESCRIPTION OF THE DRAWINGS

FIG. 1 is a block diagram of an existing technique for expanding a single shelf network system by interconnecting two single shelf network systems using input/output cards.

FIG. 2 is a block diagram of an existing technique for expanding a single shelf network system by interconnecting two single shelf network systems by installing expansion cards in dedicated expansion card slots.

FIG. 3 is a block diagram illustrating a network system in accordance with an embodiment of the present invention.

DETAILED DESCRIPTION OF THE FIGURES

Figure 4:
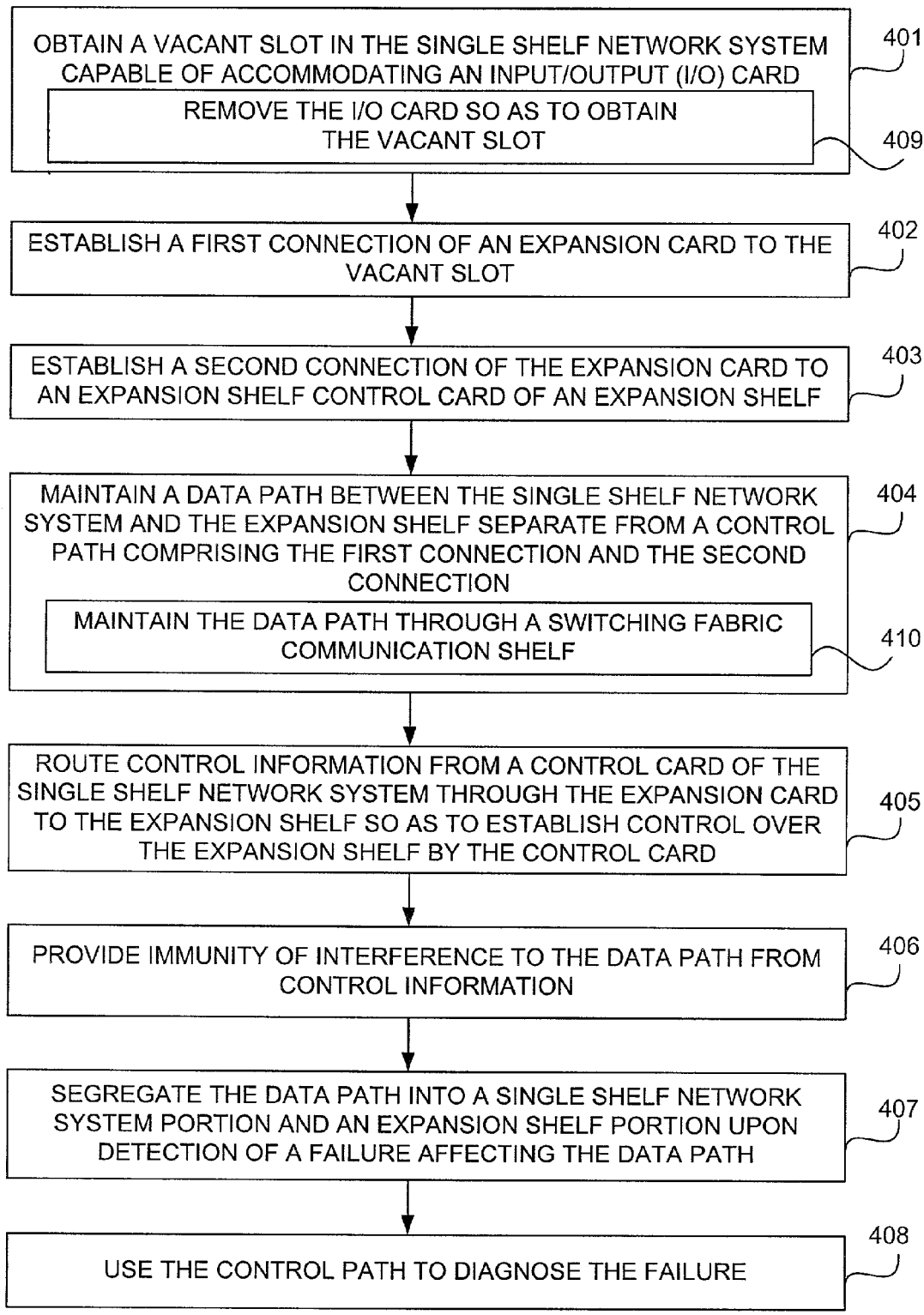
FIG. 4 is a flow diagram illustrating a method in accordance with an embodiment of the present invention.

A single shelf network system capable of providing expansion to a multiple shelf mode is described. In one embodiment, slots are provided in a single shelf network system that are capable of accepting either I/O cards or expansion cards. When such a single shelf network system is to be operated in a single shelf mode, such slots may be provided with I/O cards to maximize the data transport capability of the single shelf network system. However, to expand the single shelf network system to function as a multiple shelf network system, the slots are provided with expansion cards. The expansion cards serve to couple a control card of the single shelf network system to one or more expansion shelves, thereby allowing the control card to exert control over the one or more expansion shelves. Since a single expansion card can support multiple expansion shelves, the number of slots of the single shelf network system needed to support expansion does not increase as additional expansion shelves are added. This scale of expandability is possible since the expansion cards do not need, in themselves, to provide both a data path for communication of data and a control path for communication of control information. Rather, an expansion card need only provide a control path for communication of control information, with a data path preferably being provided separately. For example, fabric interface cards may be used to couple the single shelf network system and the expansion shelves to a switching fabric communication shelf. The switching fabrics of the single shelf network system and the expansion shelves may be coupled to the switching fabric communication shelf. Alternatively, the switching fabrics of the single shelf network system and the expansion shelves may be supplanted by the switching fabric communication shelf.

According to an embodiment of the invention, the expansion of a single shelf network system to serve as a multiple shelf network system may be performed so as to provide redundancy. Redundancy allows substitution of an operational element for a failed element even before repair, removal, or replacement of failed element can be performed. By implementing two or more instances of the elements described in accordance with various embodiments of the invention and a capability to select one such instance to as active, embodiments of the invention providing redundancy are readily provided.

FIG. 3 is a block diagram illustrating a network system in accordance with an embodiment of the present invention. Single shelf network system 301 comprises switching fabric 304, control card 305, and I/O cards 306–308. I/O cards 306–308 are coupled to card slots compatible with both I/O cards and expansion cards, for example, expansion card 314. Thus, one of I/O cards 306–308 may be removed and replaced with expansion card 314 to allow expansion of the single shelf network system. Yet, when single shelf network system 301 is operating in a single shelf mode, I/O cards 306–308 may populate all available slots, thereby providing the maximum possible bandwidth.

Expansion card 314 is coupled to a control card 310 of expansion shelf 302 and to control card 318 of expansion shelf 316. Expansion shelf 302 comprises switching fabric 309, control card 310, and I/O cards 311–313. Expansion shelf 316 comprises switching fabric 317, control card 318, and I/O cards 319–321. Expansion card 314 communicates control information between single shelf network system 301 and expansion shelves 302 and 316 via expansion link 303. As indicated by the ellipsis, additional expansion shelves beyond expansion shelves 302 and 316 may be supported by expansion card 314, within expansion card 314 coupled to a control card in each of the expansion shelves.

While expansion link 303 provides a control path over which control information may be communicated, data, such as user data which, for example, may come from a source and be destined for a destination outside of the network system illustrated in FIG. 3, may be communicated over a data path, which is preferably separate from the control path. A switching fabric communication shelf, such as switching fabric communication shelf 322, may be used to provide such a data path. In this example, switching fabric 304 of single shelf network system 301 is coupled to a switching fabric interface card 325 of switching fabric communication shelf 322 via data link 328. Switching fabric 309 of expansion shelf 302 is coupled to switching fabric interface card 327 of switching fabric communication shelf 322 via data link 329. Switching fabric 317 of expansion shelf 316 is coupled to switching fabric interface card 326 of switching fabric communication shelf 322 via data link 330. In addition to switching fabric interface cards 325–327, switching fabric communication shelf 322 also comprises switching fabric 323 and control card 324. Expansion card 314 is coupled to control card 324 via expansion link 303. Note that expansion link 303 may be implemented as multiple cables, for example, one cable to each shelf, as illustrated by dashed lines in FIG. 3. Expansion link 303 is not limited to a particular topology, but may be implemented according to any topology, for example, bus, star, daisy-chain, ring, or any other topology.

Since the bandwidth requirements placed on expansion link 303 are relatively modest compared to the bandwidth needed for communication of data, Expansion card 314 and expansion link 303 can readily provide sufficient bandwidth to communicate all control information, even for a system with many expansion shelves, and still support fully non-blocking operation of the overall system. Thus, the disadvantages of previous techniques that did not provide non-blocking operation are avoided. Also, the use of switching fabric communication shelf 322 provides a relatively short data path between the other shelves, thereby avoiding the extended data paths that may have been necessary if previous techniques required daisy-chaining several shelves together to obtain a given network capability.

It should be noted that the term "shelf" is used, in some contexts, to refer to one housing of rack-mountable equipment or as a denomination of some physical quantity, the term is not intended to be strictly limited to a particular configuration of a network system or a component thereof. Likewise, the term "card," in some contexts, is understood to refer to a printed circuit board or module with a separable connector, the term is not intended to be strictly limited to a particular configuration of a component of a network system. Also, while certain numbers of certain elements, for example, I/O cards, are illustrated as examples, it should be understood that embodiments of the invention may be practiced with different numbers of elements. Furthermore, it should be understood that, in order to save space, a smaller version of an expansion shelf may be combined with a smaller version of a switching fabric communication shelf, such that the combination resides within a single shelf.

FIG. 4 is a flow diagram illustrating a method in accordance with an embodiment of the present invention. In step 401, a vacant slot in the single shelf network system capable of accommodating and I/O card is obtained. Such a slot is readily obtained if, in fact, the slot is already vacant. Otherwise, such a slot may be obtained as described in step 409. In step 409, an I/O card occupying a desired slot is removed so as to obtain the vacant slot. While removal of an I/O card would end any communication of data through that I/O card, disruption of data communication can be avoided or minimized by removing all or most connections from the I/O card prior to its removal. For example, at a time sufficiently prior to the removal of the I/O card, new connections can be established using other I/O cards, and existing connections can be transferred to other I/O cards, thereby minimizing disruption when the I/O card is removed. It should be noted that, with hot-swappable cards, an I/O card may be removed and an expansion card installed without disruption to other processing occurring elsewhere in the single shelf network system, for example, on the other I/O cards.

In step 402, a first connection of an expansion card is established to the vacant slot. Such a connection may be established by mounting the expansion card in the vacant slot. In step 403, a second connection of the expansion card is established to an expansion shelf control card of an expansion shelf. In step 404, a data path is maintained between the single shelf network system and the expansion shelf. The data path is separate from a control path, wherein the control path comprises the first connection and the second connection. Step 404 may also include step 410. In step 410, the data path through the switching fabric communication shelf is maintained.

From step 404, the process continues to step 405. In step 405, information from a control card of the single shelf network system is routed through the expansion card to the expansion shelf so as to establish control over the expansion shelf by the control card. In step 406, immunity of interference to the data path from the control information is provided. By providing a control path for control information separate from the data path, any ambiguity that might result in misinterpretation of control information and/or interference to data being communicated over the data path is avoided. In step 407, the data path is segregated into a single shelf network system portion and an expansion shelf portion upon detection of a failure of affecting the data path. By segregating the data path, more localized analysis may be performed within the single shelf network system and within the expansion shelf in an effort to identify the cause of the failure. In step 408 the control path is used to diagnose the failure. By providing a separate control path, the control path need not be segregated, even as the data path is segregated, thereby allowing communication of control information during the analysis to identify the source of the failure. This ability to continue communication of control information even when the data path is segregated can greatly increase the efficiency of failure diagnosis, thereby allowing the network system to return to normal operation as quickly as possible.

Accordingly, a single shelf network system capable of providing expansion to a multiple shelf mode has been described. It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A single shelf network system adapted to operate in either a single shelf mode or a multiple shelf mode, wherein the single shelf network system comprises:
   at least one slot connector adapted to receive an input/output (I/O) card when the single shelf network system is operating in the single shelf mode and an expansion card when the single shelf network system is operating in the multiple shelf mode, wherein the I/O card provides communication of user data and expansion card provides communication of control information.

2. The single shelf network system of claim 1 wherein the expansion card is coupled to and provides communication of control information with at least one control card of at least one expansion shelf network element.

3. The single shelf network system of claim 2 wherein the expansion card provides communication of control information with at least one I/O card of the at least one expansion shelf network element through the at least one control card of the at least one expansion shelf network element.

4. The single shelf network system of claim 2 wherein a control card of the single shelf network system centralizes control of the single shelf network system including the at least one expansion shelf network element and exerts control over the at least one expansion shelf network element.

5. The single shelf network system of claim 1 further comprising:
   a data path for communication of the user data; and
   a control path distinct from the data path for communication of the control information.

6. A multiple shelf network system comprising:
   an expansion shelf having an expansion shelf control card and an expansion shelf switching fabric; and
   a single shelf system having an expansion card coupled to the expansion shelf control card for communicating control information between the single shelf system and the expansion shelf and having a switching fabric coupled to the expansion shelf switching fabric for communicating data between the single shelf system and the expansion shelf.

7. The multiple shelf network system of claim 6 wherein the single shelf system further includes a control card, the control card coupled to the expansion card, the control card exerting control over the single shelf system and the expansion shelf.

8. The multiple shelf network system of claim 6 wherein the switching fabric is coupled to the expansion shelf switching fabric through a switching fabric communication shelf.

9. The multiple shelf network system of claim 6 wherein the expansion card is adapted to be replaceable by an input/output (I/O) card upon conversion of the multiple shelf network system to a single shelf network system.

10. A network system comprising:
    a data path adapted to communicate data between an input/output (I/O) card and a switching fabric when the network system is operating in a single shelf mode and, further, to communicate the data between a switching fabric and an expansion shelf switching fabric when the network system is operating in a multi-shelf mode; and
    a control path adapted to communicate control information between a control card and the switching fabric when the network system is operating in the single shelf mode and, further, to communicate the control information between the control card and an expansion shelf control card when the network system is operating in the multi-shelf mode.

11. The network system of claim 10 wherein the data path and the control path are separate from one another.

12. The network system of claim 10 wherein, upon occurrence of a failure affecting the data path, the data path is segregated into a switching fabric portion and an expansion shelf switching fabric portion, while the control path provides communication for diagnosis of the failure.

13. The network system of claim 10 wherein the data path is immune to interference from the control information on the control path.

14. The network system of claim 10 wherein the data path communicates the data between the switching fabric and the expansion shelf switching fabric via a switching fabric communication shelf.

15. The network system of claim 14 wherein the switching fabric communication shelf is incorporated within an expansion shelf, the expansion shelf incorporating the expansion shelf switching fabric.

16. The network system of claim 10 wherein the data path and the control path provide non-blocking communication between the switching fabric and the expansion shelf switching fabric.

17. A method for expanding a single shelf network system to a multiple shelf network system comprising the steps of:
obtaining a vacant slot in the single shelf network system capable of accommodating an input/output (I/O) card;
establishing a first connection of an expansion card to the vacant slot;
establishing a second connection of the expansion card to an expansion shelf control card of an expansion shelf; and
routing control information from a control card of the single shelf network system through the expansion card to the expansion shelf so as to establish control over the expansion shelf by the control card.

18. The method of claim 17 further comprising the steps of:
maintaining a data path between the single shelf network system and the expansion shelf separate from a control path comprising the first connection and the second connection.

19. The method of claim 18 further comprising the step of:
segregating the data path into a single shelf network system portion and an expansion shelf portion upon detection of a failure affecting the data path.

20. The method of claim 19 further comprising the step of:
using the control path to diagnose the failure.

21. The method of claim 18 further comprising the step of:
providing immunity of interference to the data path from control information.

22. The method of claim 18 wherein the step of maintaining a data path further comprises the step of:
maintaining the data path through a switching fabric communication shelf.

23. The method of claim 22 wherein the switching fabric communication shelf is integrated into the expansion shelf.

24. The method of claim 17 wherein the step of routing control information enables non-blocking communication between the single shelf network system and the expansion shelf.

25. The method of claim 17 wherein the step of obtaining a vacant slot further comprises the step of:
removing the I/O card so as to obtain the vacant slot.

* * * * *